United States Patent [19]

Shindo

[11] Patent Number: 4,716,431
[45] Date of Patent: Dec. 29, 1987

[54] OPTICAL SYSTEM FOR USE IN FOCUS DETECTING APPARATUS

[75] Inventor: Osamu Shindo, Tokyo, Japan

[73] Assignee: Asahi Kogaku Kogyo Kabushiki Kaisha, Tokyo, Japan

[21] Appl. No.: 889,535

[22] Filed: Jul. 25, 1986

[30] Foreign Application Priority Data

Jul. 26, 1986 [JP] Japan .................. 60-166580

[51] Int. Cl.$^4$ .................................... G03B 3/00
[52] U.S. Cl. ............................ 354/407; 356/4
[58] Field of Search ............... 354/406, 407, 408; 356/4

[56] References Cited

U.S. PATENT DOCUMENTS 4,500,189  2/1985  Aoki .................... 354/407
4,552,445 11/1985  Mukai et al. .......... 354/406
4,573,784  3/1986  Suzaki ................. 354/406

Primary Examiner—L. T. Hix
Assistant Examiner—Brian W. Brown
Attorney, Agent, or Firm—Sughrue, Mion, Zinn, Macpeak & Seas

[57] ABSTRACT

An optical system for use in a focus detecting apparatus comprising a condenser lens disposed at a film equivalent surface or in the vicinity thereof and a pair of splitting optical elements which are disposed behind said condenser lens in a manner symmetrical with respect to the meridional plane of said condenser lens. The focus position is detected by sensing a relative positional mismatch between the images of the object refocused by the respective splitting optical elements. The rear surface of said condenser lens is an ellipsoidal surface which satisfies the relation $-1 < k < 0$ when it is expressed by the formula for a quadratic surface:

$$x = \frac{ch^2}{1 + \sqrt{1 - (k + 1)c^2 h^2}}$$

An auxiliary lens which is coaxial with said condenser lens is disposed just in front of said splitting optical elements.

1 Claim, 13 Drawing Figures

OPTICAL SYSTEM FOR USE IN FOCUS DETECTING APPARATUS

BACKGROUND OF THE INVENTION

The present invention relates to an optical system for use in a focus detecting apparatus in an imaging device such as a camera.

Many apparatus have been proposed wherein the image of the object is transmitted through an optical system disposed behind a film equivalent surface, the so transmitted image is split into substantially similar two images, and the focus position is detected by sensing the relative positional mismatch between said two images. Applications which have been filed in this field are Unexamined Published Japanese Patent Application No. 39544/1975 entitled "Focus Detecting Apparatus", Unexamined Published Japanese Patent Application No. 82419/1977 for "Apparatus for Photoelectrically Determining the Position of the Sharp Surface of an Image", and Japanese Patent Publication No. 13929/1981 for "Focus Adjusting Apparatus".

The optical systems disclosed in these applications are common in that they consist essentially of a lens group for backward transmission of the image of the object and optical elements for splitting the transmitted image into two substantially similar images. However, none of these systems are designed to incorporate due consideration with respect to aberrations. Therefore, an application was filed for the purpose of solving the problem of aberrations in an optical system, particularly a bright one (Unexamined Published Japanese Patent Application No. 75209/1984 entitled "Optical System for Use in Focus Position Detecting Apparatus").

In this prior application, it is stated that the performance of the condenser lens disposed at the film equivalent surface or in the vicinity thereof influences the distribution of the quantity of light on the sensor. It is also stated that providing the condenser lens with an aspheric surface is effective in stabilizing the distribution of the quantity of light on the sensor. In the system proposed in this prior application, any asymmetrical aberrations such as distortion are to be eliminated by the basic optical arrangement. However, the reflective members employed in the system render it difficult to attain proper focus adjustment. In addition, because of the residual coma aberration left in the condenser with an aspheric surface, the quantity of light received at the sensor decreases progressively as it approaches the bits at the ends of the sensor and this is quite deleterious to the "predicting" capability of the system. The basis for this criticism of the system of Unexamined Published Japanese Patent Application No. 75209/1984 will be described later in this specification.

In Unexamined Published Japanese Patent Application No. 32012/1985 entitled "Apparatus for Detecting the Focus of a Camera", distortions are corrected by a condenser lens with an aspheric surface because they cannot be corrected by the basic optical arrangement. This apparatus is composed of transmissive members and allows for easy focus adjustment. The apparatus has the additional advantage of low cost since it processes data with only one sensor unit. However, this apparatus has many problems because of the incompleteness of the basic optical arrangement.

Before touching upon these problems, it will be necessary to discuss the properties that should be possessed by all optical systems for use in the focus detecting apparatus of the type contemplated by the present invention. The most important property that should be realized is that a single focus position is definitely determined irrespective of the point in the effective range of the film equivalent surface (this range is hereinafter referred to as the rangefinding zone) at which the image of the object to be processed is formed. This property is directly related to the precision of focus detection by the apparatus and to the uniformity in precision within the rangefinding zone. Since splitting optical elements are disposed symmetrically with respect to the meridional plane of the condenser lens, an optical system which possesses this property must have the ability to form an image which is symmetrical with respect to the point on the sensor that corresponds to the central point of the rangefinding zone. In a special case, the ability to form an image on the sensor is invariant irrespective of the point in the rangefinding zone at which the image of the object is formed. In this "shift invariant" mode, the correct focus position can be predicted from the amount of mismatch between the two split images.

This "predicting" capability plays an important role in adjusting and controlling the focus of a photographic lens. In fact, however, a considerable degree of freedom is permissible in designing a focus detecting apparatus because even an optical system that does not feature the "predicting" capability will allow for focus detection with satisfactory results.

Let us now discuss the effects that may be exerted on the distribution of the quantity of light on the sensor by aberrations developing in the condenser lens. FIGS. 5 and 6 illustrate the correlation between the luminous flux taken in by the splitting optical elements 5 and the route of its passage through the exit pupil 7. As is clear from these figures, the route of passage of the luminous flux through the center and the peripheral portion of the range-finding zone 1 differs with the type of aberration occurring in the condenser lens 2. Since the points in the rangefinding zone correspond to the bits in the sensor, the area of the specific site at which the luminous flux passes through the exit pupil 7 corresponds to the signal level of each bit. FIG. 5 shows the case where the condenser lens 2 has a spherical aberration; in this case, there is no notable variation in the quantity of light received by the bits in the sensor but the effective diameter of the taking lens must be comparatively large. FIG. 6 shows the case where a coma aberration (outward coma in the illustrated case) occurs in the condenser lens 2. In this case, the quantity of light decreases progressively toward the bits at the ends of the sensor. This provides the basis for our criticism of the system proposed in Unexamined Published Japanese Patent Application No. 75209/1984.

The foregoing discussion will enable the reader to understand that the aberration in a condenser lens are closely related to the distribution of the quantity of light on the sensor. It is generally held that for practical purposes the asymmetry in the distribution of the quantity of light on the sensor, namely the difference between the signals issuing from the bits at the ends of the sensor, must not exceed 1%.

Let us now discuss the problems of the optical system proposed in Unexamined Published Japanese Patent Application No. 32012/1985. FIGS. 7, 8 and 9 visualize three optical properties as evaluated from the data shown in Table 1 in connection with one embodiment of this prior art system. FIG. 7 shows the distribution of the brightness of point images on the sensor; FIG. 8 shows the distortion in the condenser lens; and FIG. 9 shows the distribution of the quantity of light on the sensor. Since symmetry is important for the distortion in the condenser lens and the distribution of the quantity of light on the sensor, each of FIGS. 8 and 9 is accompanied by a separate figure (Fig. (b) in each case) in order to provide better judgment for symmetry. The distortion shown in FIG. 8 is not referenced to the principal ray of light but referenced to the center of gravity as determined from the distribution of image brightness shown in FIG. 7, which is believed to better simulate reality.

As FIG. 8 shows, the distortion in the condenser lens which is used in the optical system proposed in Unexamined Published Japanese Patent Application No. 32012/1985 has a very high degree of symmetry, as claimed by the applicant. However, the other two parameters, in particular, the distribution of the quantity of light on the sensor, are highly asymmetric and the operable lengthh of the rangefinding zone would be no greater than 2 mm. If the rangefinding zone is short, the reliability of the system in the operation of focus detection will be decreased when it is equipped with a long-focus photographic lens. Therefore, with a rangefinding zone whose operable length is approximately 2 mm, a photographic lens having a longer focal distance (f) than 300 mm would not be usable. In fact, however, lenses having longer focal distances are available for use with commercial single-reflex lens cameras, and in order to realize effective focus detection with these lenses, rangefinding zones longer than 2 mm are required.

The aforementioned asymmetric nature of the optical system disclosed in Unexamined Published Japanese Patent Application No. 32012/1985 results largely from the fact that the principal ray of light emerging from the center of the rangefinding zone does not fall upon the sensor perpendicularly; as a consequence the principal rays of light in the luminous flux emerging from both ends of the rangefinding zone are unable to intersect the sensor at equal angles.

OBJECT AND SUMMARY OF THE INVENTION

The primary object, therefore, of the present invention is to provide an optical system that ensures the formation of a symmetrical image over a sufficiently long rangefinding zone to accomplish reliable focus-detecting operation with a long-focus lens.

According to the invention, there is provided an optical system for use in a focus detecting apparatus which comprises a condenser lens disposed at a film equivalent surface or in the vicinity thereof and a pair of splitting optical elements which are disposed behind said condenser lens in a manner symmetrical with respect to the meridional plane of said condenser lens, the focus position being detected by sensing a relative positional mismatch between the images of the object refocused by the respective splitting optical elements, wherein the rear surface of said condenser lens is an ellipsoidal surface which satisfies the relation $-1 < k < 0$ when it is expressed by the formula for a quadratic surface:

$$x = \frac{ch^2}{1 + \sqrt{1 - (k + 1)c^2h^2}}$$

and wherein an auxiliary lens which is coaxial with said condenser lens is disposed just in front of said splitting optical elements.

DESCRIPTION OF THE PREFERRED EMBODIMENTS

Figure 1:
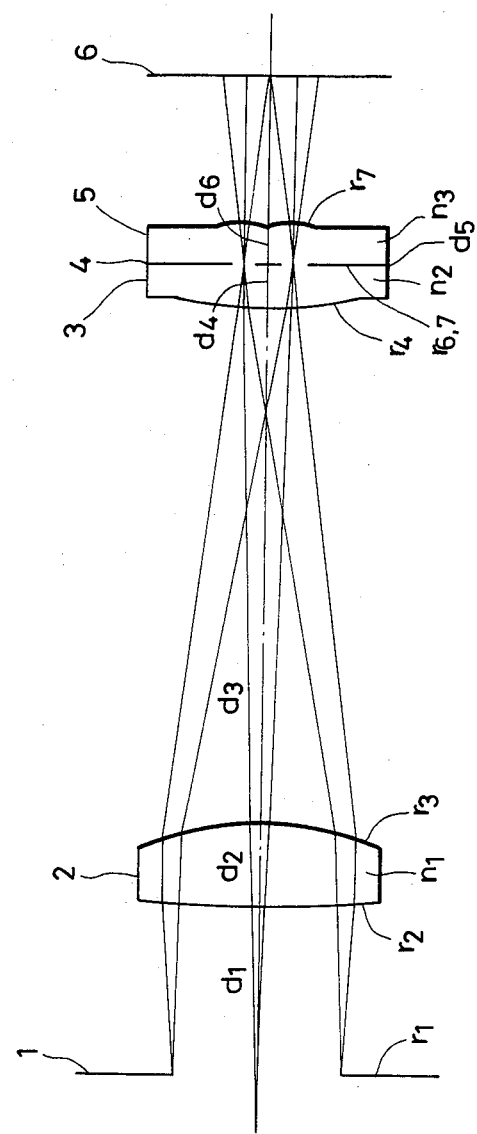
FIG. 1 shows the layout of an optical system according to one embodiment of the present invention.

The layout of an optical system according to one embodiment of the present invention is shown in FIG. 1. From a functional viewpoint, the condenser is best positioned at the film equivalent surface. But in the embodiment shown in FIG. 1 where the rangefinding zone 1 has a length of about 4 mm, any adverse effect resulting from the ingress of foreign matter such as dust or dirt must be avoided by disposing a condenser lens 2 with an aspherical rear surface at a position slightly away from the film equivalent surface (i.e., in the vicinity of the film equivalent surface), with an auxiliary lens 3 being disposed behind said condenser lens for the purpose of permitting the principal ray of light emerging from the center of the rangefinding zone 1 to intersect the sensor at right angles. The other components of the system e.g. diaphram 4, splitting optical elements 5 and sensor 6, will not need to be explained since their arrangement is substantially the same as in the prior art system.

Technical data for the best mode of the configuration of the embodiment shown in FIG. 1 are given in Table 1.

TABLE 1

| | |
|---|---|
| Film equivalent surface: | $r_1 = \infty$ |
| | $d_1 = 4.00$ mm AIR |
| Condenser lens: | $r_2 = 40.000$ mm |
| | $d_2 = 2.00$ mm, $n_1 = 1.49186$ |
| | $r_3 = -7.155$ mm |
| | ($k = -0.70$) |
| | $d_3 = 12.21$ mm AIR |
| Auxiliary lens: | $r_4 = 10.416$ mm |
| | $d_4 = 1.00$ mm, $n_2 = 1.49186$ |
| | $r_5 = \infty$ |
| | $d_5 = 0.04$ mm AIR |
| Splitting optical elements: | $r_6 = \infty$ |
| | $d_6 = 1.00$ mm, $n_3 = 1.49186$ |
| | $r_7 = -1.700$ |

The rear surface of the condenser lens is aspherical and expressed by:

$$x = \frac{ch^2}{1 + \sqrt{1 - (k+1)c^2h^2}}, \quad C = 1/r_3$$

The action of the mechanism of the constituent elements of the optical system as claimed by the present invention and the results attained by that action are hereunder described.

As already mentioned, the primary function of the auxiliary lens 3 is to allow the principal ray of light emerging from the center of the rangefinding zone 1 to intersect the sensor at right angles. The present inventor has found that this auxiliary lens 3 is also effective in correcting distortions while causing little effect on the distribution of the quantity of light on the sensor. The condenser lens 2 having an aspheric surface is capable of effectively correcting both the distribution of the quantity of light on the sensor and the distortion in the condenser lens. In the prior art techniques, one of these parameters cannot be corrected properly without degrading the other parameter because of the difference in the aspheric coefficient that allows the two parameters to be reduced to minimum values. However, in the present invention, it has been found that the auxiliary lens 3 is effective for correcting the distortion in the condenser lens, so it has become possible to employ the condenser lens 2 with an spherical surface solely for the purpose of correcting the distribution of the quantity of light on the sensor. In order to eliminate the possibility of coma aberration and distortion occurring in the condenser lens 2, its front surface must have a large radius of curvature and it has been found that no great advantage will result if the front surface is rendered aspherical. On the other hand, very good results were obtained when the rear surface of the condenser lens 2 was made aspherical.

Figure 2:
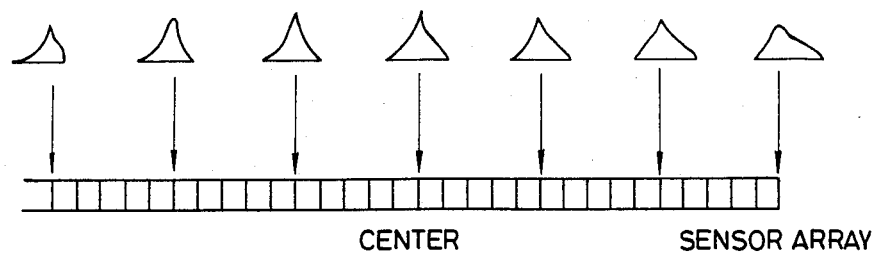
FIG. 2 is a diagram showing the distribution of the brightness of point images on a sensor.
Figure 3A:
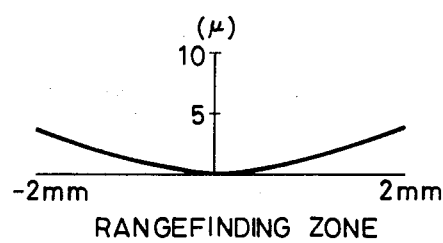
FIG. 3(a) is a diagram showing the profile of distortion which occurs in the condenser lens used in the optical system of FIG. 1.
Figure 3B:
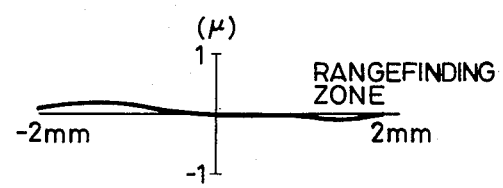
FIG. 3(b) is a diagram showing the asymmetry of the distortion in FIG. 3(a)
Figure 4A:
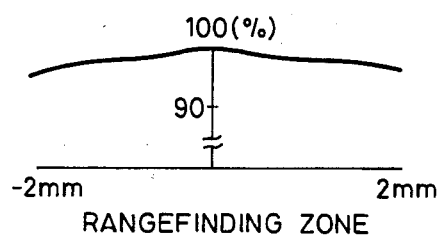
FIG. 4(a) is a diagram showing the distribution of the quantity of light on the sensor used in the optical system of FIG. 1.
Figure 4B:
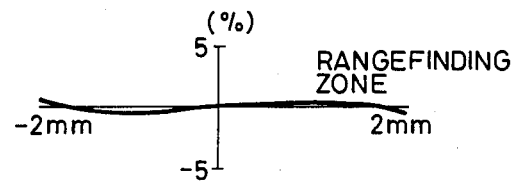
FIG. 4(b) is a diagram showing the asymmetry of the distribution of the quantity of light illustrated in FIG. 4(a)
Figure 5:
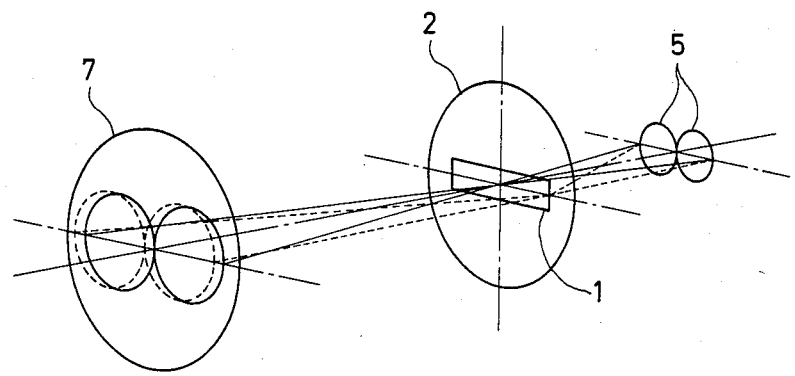
FIG. 5 is a sketch illustrating the result of the occurrence of residual spherical aberration in the condenser lens.
Figure 6:
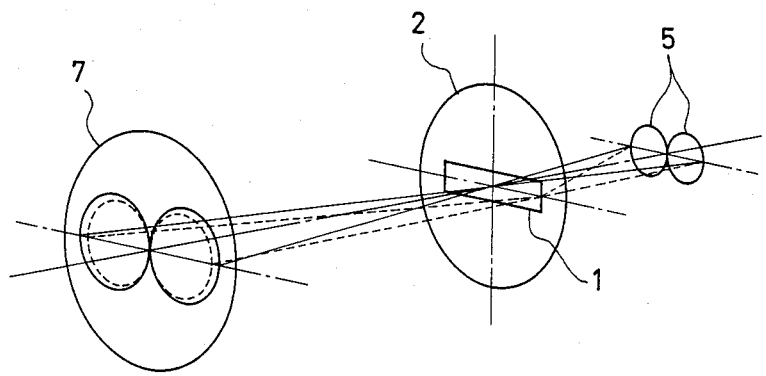
FIG. 6 is a sketch illustrating the result of the occurrence of residual coma aberration in the condenser lens.
Figure 7:
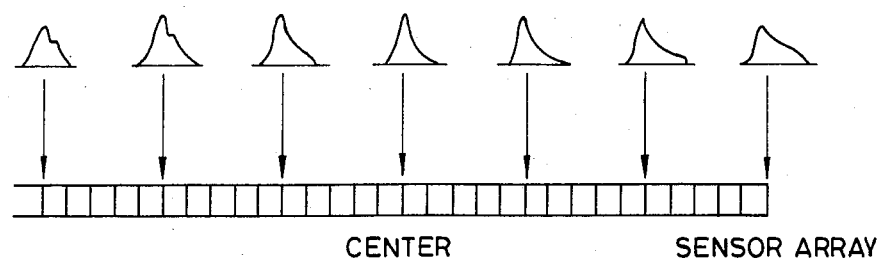
FIG. 7 is a diagram showing the distribution of the brightness of point images on the sensor employed in a prior art optical system for use in a focus detecting apparatus.
Figure 8A:
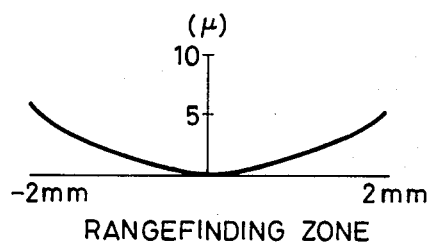
FIG. 8(a) is a diagram showing the profile of distortion which occurs in the condenser lens used in the prior art optical system.
Figure 8B:
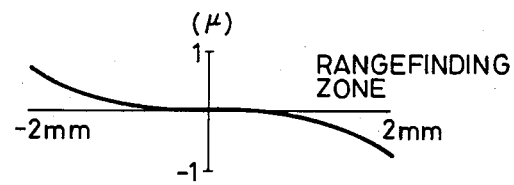
FIG. 8(b) is a diagram showing the asymmetry of the distortion illustrated in FIG. 8(a), the y-axis of both FIGS. 8(a) and (b) plotting the actual amount of distortion in microns rather than in percentages for the sake of clarity.
Figure 9A:
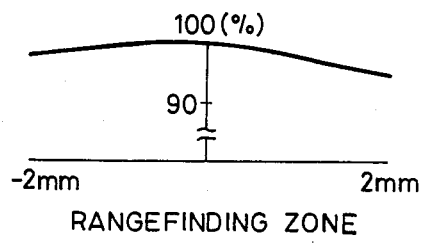
FIG. 9(a) is a diagram showing the distribution of the quantity of light on the sensor used in the prior art optical system.
Figure 9B:
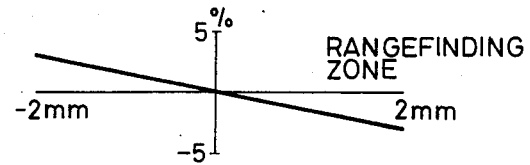
FIG. 9(b) is a diagram showing the asymmetry of the distribution of the quantity of light illustrated in FIG. 9(a).

The advantages of the optical system expressed in Table 1 may be best understood by comparing the set of FIGS. 2, 3 and 4 with that of FIGS. 7, 8 and 9 which show the characteristics of the system proposed in Unexamined Published Japanese Patent Application No. 32012/1985. As is clear from FIGS. 2 to 4, the ability of the optical system of the present invention to form a symmetrical image is significantly improved over the prior art system with respect to the distribution of the brightness of point images on the sensor, distortion in the condenser lens, and the distribution of the quantity of light on the sensor.

It is not within the scope of the present invention for the aspheric coefficient to be either positive ($k \geq 0$) or equal to or smaller than minus one ($k \leq -1$) because in no case could the aforementioned satisfactory results be attained if the aspheric coefficient were to be within the ranges specified above. It should however be noted that an ellipsoidal surface which satisfies the relation: $-1 < k < 0$ is included within the scope of the present invention.

Analysis by computer simulation has shown that for practical purposes, an error within the approximate range of $\pm 0.1$ is permissible for the aspheric coefficient $k$. This permissible range will increase if the length of the rangefinding zone is shortened.

As described in the foregoing pages, the present invention provides an optical system for use in a focus-detecting apparatus which comprises a condenser lens disposed at a film equivalent surface or in the vicinity thereof and a pair of splitting optical elements which are disposed behind said condenser lens in a manner symmetrical with respect to the meridional plane of said condenser lens, and the focus position being detected by sensing the relative positional mismatch between the images of the object refocused by the respective splitting optical elements. The optical system of the present invention is characterized in that the rear surface of said condenser lens is an ellipsoidal surface which satisfies the relation $-1 < k < 0$, and that an auxiliary lens which is coaxial with said condenser lens is disposed just in front of said splitting optical elements. Because of this arrangement, the optical system of the present invention guarantees the formation of a symmetrical image, thereby providing a rangefinding zone which is capable of satisfactory focus detection with a long-focus taking lens.

I claim:

1. In an optical system for use in a focus detecting apparatus which comprises a condenser lens disposed at a film equivalent surface or in the vicinity thereof and a pair of splitting optical elements which are disposed behind said condenser lens in a manner symmetrical with respect to the meridional plane of said condenser lens, the focus position being detected by sensing a relative positional mismatch between the images of the object refocused by the respective splitting optical elements, the improvement wherein the rear surface of said condenser lens is an ellipsoidal surface which satisfies the relation $-1 < k < 0$ when it is expressed by the formula for a quadratic surface:

$$x = \frac{ch^2}{1 + \sqrt{1 - (k+1)c^2h^2}}$$

and wherein an auxiliary lens which is coaxial with said condenser lens is disposed just in front of said splitting optical elements.

* * * * *